United States Patent [19]

Korber et al.

[11] 4,362,846

[45] Dec. 7, 1982

[54] POLYAMIDE MOULDING COMPOUNDS HAVING HIGH IMPACT STRENGTH

[75] Inventors: Helmut Korber, Odenthal; Peter Tacke, Krefeld; Friedrich Fahnler, Krefeld; Dieter Neuray, Krefeld; Frieder Heydenreich, Ratingen, all of Fed. Rep. of Germany

[73] Assignee: Bayer Aktiengesellschaft, Leverkusen, Fed. Rep. of Germany

[21] Appl. No.: 254,621

[22] Filed: Apr. 16, 1981

Related U.S. Application Data

[63] Continuation of Ser. No. 155,776, Jun. 2, 1980, abandoned, which is a continuation of Ser. No. 971,385, Dec. 20, 1978, abandoned.

[30] Foreign Application Priority Data

Dec. 29, 1977 [DE] Fed. Rep. of Germany ....... 2758568
Jan. 14, 1978 [DE] Fed. Rep. of Germany ....... 2801585

[51] Int. Cl.³ ..................... C08L 77/00; C08L 51/06
[52] U.S. Cl. ..................................... 525/66; 525/183
[58] Field of Search .......................................... 525/66

[56] References Cited

U.S. PATENT DOCUMENTS

| 3,373,222 | 3/1968 | Armstrong | 260/857 L |
| 3,484,403 | 12/1969 | Brunson | 260/857 L |

FOREIGN PATENT DOCUMENTS

| 2703416 | 3/1978 | Fed. Rep. of Germany ... | 260/857 G |
| 45-30943 | 7/1970 | Japan | 260/857 L |
| 45-30944 | 7/1970 | Japan | 260/857 L |
| 45-30945 | 7/1970 | Japan | 260/857 L |
| 46-38023 | 9/1971 | Japan | 260/857 L |
| 49-20280 | 2/1974 | Japan | 260/857 G |
| 1403797 | 8/1975 | United Kingdom . | |

*Primary Examiner*—Paul Lieberman
*Attorney, Agent, or Firm*—Connolly and Hutz

[57] ABSTRACT

Polymer blends consisting of from 60-99 % by weight of polyamide and of from 1-40 % by weight of a graft product of polyethylene or copolymers of ethylene with grafted units of (meth)acrylic acid and/or (meth)acrylic acid derivatives and/or maleic acid which graft products have been prepared by a special grafting process.

10 Claims, No Drawings

POLYAMIDE MOULDING COMPOUNDS HAVING HIGH IMPACT STRENGTH

CROSS REFERENCE TO RELATED APPLICATIONS

This application is a continuation of application Ser. No. 155,776 filed June 2, 1980, and now abandoned, which in turn is a continuation of application Ser. No. 971,385 filed Dec. 20, 1978, and now abandoned.

This invention relates to homogeneous polyamide moulding compositions which contain graft polymers of unsaturated acids and/or their derivatives on polyethylenes to improve their impact strength.

The impact strength of moulded articles produced from polyamide moulding compounds depends to a considerable extent on their water content. In dry state they are sensitive to impact and attain their well known high impact strength only by conditioning, i.e. absorption of water. Conditioning of polyamides is, however, a time-consuming procedure which takes several days, particularly since the water must not be concentrated in the surface layers but must be uniformly distributed throughout the moulded article.

It has therefore repeatedly been attempted to mix polyamides with suitable substances which would impat to them in the dry state the impact strength which could otherwise only be produced by conditioning.

The impact strength of polyamide moulding compounds can be improved, for example, by the incorporation of low molecular weight plasticizers, but these plasticizers have the following disadvantages:

1. A part of the plasticizer evaporates, since in most cases they have a high vapour pressure under the conditions of incorporation into the polyamide.
2. The low molecular weight plasticizers tend to be lost by exudation.
3. They fail to plasticize at low temperatures.
4. The improvement of the impact strength is combined with a considerable drip in the flexural strength and elastic modulus.

It has also been attempted to improve the impact strength of polyamides by the addition of polyethylene. Commercial polyethylene, however, is not compatible with polyamides. Test samples of such alloys undergo severe scaling in the buckling test.

According to German Auslegeschrift No. 1,694,802, the compatibility of polyamides with polyethylene can be improved by the addition of copolymers of ethylene and acrylic acid (derivatives). The compatability remains, however, unsatisfactory.

Improvement of the impact strength of polyamide moulding compounds by the addition of copolymers of ethylene and vinyl acetate has been disclosed in German Auslegeschrift No. 1,138,922.

An improvement in the impact strength of polyamide moulding compounds by the addition of copolymers of ethylene and α, β-unsaturated acids or their derivatives has been described in numerous publications, for example in U.S. Pat. No. 3,742,916 and German Pat. Nos. 1,241,606; 1,544,706 and 1,669,702.

All these proposed solutions for improving the impact strength of polyamide moulding compounds have, however, the disadvantage that they result in a relatively severe loss of rigidity and hence of E-modulus and of flexural strength. This is because the copolymers used have a pronounced plasticizing action.

Blends of polyamides with numerous copolymers and graft polymers in which the impact strength is considerably improved have been described in German Offenlegungsschrift No. 2,622,973. High impact strength mixtures of polyamides with graft polymers of acrylic acid and its derivatives on α-olefin-vinyl ester copolymers have also been disclosed in German Offenlegungsschrift No. 2,454,770, but the graft polymers used for this purpose are prepared by a complicated method of impregnating the copolymer granulates with graft monomers containing the polymerisation initiator in solution. Moreover, not all the important mechanical properties reach the desired level in these blends.

It was therefore an object of the present invention to provide homogeneous high impact resistant polyamide moulding compositions in which the other characteristic polyamide properties would be largely preserved. According to the present invention, this was achieved by blending polyamides with graft products based on polyethylene or ethylene copolymers and grafted units, e.g. of unsaturated carboxylic acids and/or their derivatives, which were prepared according to German patent application No. P 27 34 105.5.

The present invention therefore relates to polyamide blends comprising:

I. from 60 to 99% by weight, preferably from 70 to 95% by weight of at least one polyamide;

II. from 1 to 40% by weight, preferably from 5 to 30% by weight of graft products consisting of:
  (a) from 70 to 99% by weight, preferably from 75 to 95% by weight of a graft substrate of polyethylene and/or copolymers of ethylene and a vinyl ester containing up to 50% by weight of the vinyl ester, preferably vinyl acetate, and
  (b) from 1 to 30% by weight, preferably from 5 to 25% by weight of grafted units of:
    ($\alpha$) from 0 to 100% by weight, preferably from 0 to 50% by weight of (meth) acrylic acid and/or
    ($\beta$) from 0 to 100% by weight, preferably from 0 to 70% by weight of esters of (meth) acrylic acid formed from an alcohol having from 1 to 8, preferably from 2 to 4 carbon atoms and/or
    ($\gamma$) from 0 to 30% by weight, preferably from 0 to 10% by weight of acrylamide and/or
    ($\delta$) from 0 to 30% by weight, preferably from 0 to 20% by weight of maleic acid anhydride,
  which graft products are prepared by a process of graft polymerisation in which the solvent free melted polymer used as graft substrate is brought into contact with oxygen or oxygen-containing gases under conditions of vigorous mixing at a pressure of from 1 to 150 bar and a temperature of from 80° to 300° C. for a maximum of 10 minutes, the monomers which are to be grafted are added immediately thereafter with vigorous mixing in the absence of oxygen and oxygen-containing gas, and the residual monomers are removed after polymerisation; and III. from 0 to 20% by weight, preferably from 0 to 10% by weight of polyethylene, wherein the sum of I–II, of (a) to (b) and of ($\alpha$) to ($\delta$) must in each case be 100% by weight.

As already mentioned above, the graft polymers which are contained in the blends according to this invention are prepared by a very rational process in which the graft substrate need not, as has hitherto been necessary, be used as a solution or as a latex. Nor is it necessary to provide for prolonged swelling of the graft basis by the graft monomers as disclosed in German Offenlegungsschrift No. 2,454,770. Instead, polyethylene or copolymers of ethylene and vinyl acetate containing up to 50% by weight of vinyl acetate are first reacted with oxygen in the molten state under conditions of vigorous mixing, preferably in an extruder, to form peroxide groups as described in German patent application P 27 34 105.5. Grafting of the α, β-unsaturated carboxylic acids and/or their derivatives on the polyethylene then takes place in a second stage of the process, preferably during the same passage through the extruder, the peroxide groups formed in the first stage providing the initiator radicals.

Suitable graft monomers include acrylic acid, methacrylic acid, the methyl, ethyl, n-butyl, tert. butyl and 2-ethylhexyl esters of these acids, (meth) acrylamide and maleic acid anhydride. Acrylic aid, n-butyl acrylate and tert. butylacrylate are particularly suitable.

The quantity of active oxygen (peroxide groups) introduced in the first reaction step is generally from about 1,000 to 10,000 ppm. No significant reduction in the molecular weight of the graft basis occurs during the peroxidization. The activated centres are uniformly distributed over the graft substrate so that, in contrast to the known graft polymerisation processes, a very large number of active centres are available. A large number of relatively short side chains are therefore formed during the subsequent graft polymerisation.

The graft polymers hitherto known, which are prepared by radical transfer to the polymer which forms the backbone, contain 1 or 2 grafting centres per macromolecule. The molecular weights of the side chains are generally from 300,000 to 1,000,000. The graft polymers used for the polyamide moulding compounds according to the present invention have from 10 to 50 graft centres per macromolecule, and the average molecular weight of the side chains is from 5,000 to 40,000.

According to the present invention, aliphatic polyamides having a relative viscosity of from 2.3 to 4.8, preferably from 2.7 to 4.3 (determined on a 1% by weight solution in m-cresol at 20° C.) are preferably used for the preparation of the blends. Polyamide-6 and/or polyamide-6,6 are particularly preferred but also their mixtures and block polymers or copolymers of caprolactam, adipic acid and hexamethylene diamine.

Preparation of the moulding compounds according to the present invention is preferably carried out in commercial two-shaft extruders, but one-shaft extruders and kneaders may also be used.

When graft polymers prepared according to German patent application No. P 27 34 105.5 were mixed with polyamide, the melt viscosity was found to rise. This rise in viscosity was completely unexpected since it had not been observed when polyamide was mixed with the previously known copolymers and graft polymers containing the same quantity of the same comonomers.

When using the graft polymers prepared according to German patent application No. P 27 34 105.5, therefore, homogeneous moulding compounds which have a relatively high viscosity and excellent impact strength even at low temperatures can be obtained from inexpensive polyamides having a low viscosity. Grafting onto polyamides is evidently much improved compared with the polymers previously used.

To prepare high viscosity moulding compositions, it has hitherto been necessary to use high quality, highly viscous polyamides which had to be prepared from low viscosity polyamides by after-condensation.

Moulded articles produced from the moulding compounds according to the present invention show no signs of white fracture where they have been cut, buckled or subjected to pressure, nor do they show any signs of separation into their components. Furthermore, compared with moulded articles produced from known polyamide-polyolefin mixtures, they have very advantageous surface characteristics.

The moulding composition according to the present invention may also contain fillers and reinforcing substances, processing auxiliaries, nucleating agents, pigments and stabilizers in known quantities. The following are examples: chalk, quartz, wollastonite, microvite, talcum, calcium stearate, $TiO_2$, carbon black, cadmium sulphide and stearically hindered phenols.

The moulding compounds are suitable for processing in extruders and by injection moulding for the production of high impact resistant moulded articles.

EXAMPLES

Preparation of graft polymers I-XIV according to German patent application No. P 27 34 105.5.

Grafting of the monomers listed in Table 1 onto high pressure polyethylene (BAYLON ® 19 N 430 of Bayer AG) was carried out in a counter rotating double shaft laboratory extruder of the point eight type of Welding Inc. having a shaft diameter D of 20 mm and a length of 48 D. The conditions indicated in the Table were used. The melt was compressed by increasing the root diameter of the shafts in the compression zones. The shafts had a continuous pitch of 1 D.

Air was forced into the induction zone under a pressure of from 40 to 60 bar and at a rate of 80 liters per hour and into the oxidation zone at a pressure of from 20 to 40 bar and at a rate of 240 liters per hour. The graft monomers were fed into the polymerisation zone at a pressure of 5 bar. Unreacted monomers were then evaporated off and solidified as a strand and granulated.

The graft products shown in Tables 2–4 were prepared under the conditions indicated there, in a double shaft extruder having both shafts rotating in the same sense and equipped with self cleaning variable screws 32 mm in diameter and 38 D in length. Compression of the melt was achieved by the insertion of a left handed screw thread, sudden changes in the pitch of the thread, and kneading blocks shifted to the left in the double pitch variable shafts. Air was forced into the induction zone at a pressure of from 20 to 40 bar and at the rate of 100 liters per hour and into the oxidation zone at a pressure of from 20 to 30 bar and at the rate of 300 liters per hour. The graft monomers were fed into the polymerisation zone at a pressure of 2 bar. The residual monomers were removed after graft polymerisation, and the graft product was removed in the form of a strand and granulated.

The graft products shown in Table 2 were grafted onto Baylon ® 19 N 430, those in Table 3 onto Baylon ® 10 M 460 (a copolymer of ethylene and 8% by weight of vinyl acetate) and in Table 4 onto Levapren ® 450 (a copolymer of ethylene and 45% by weight of vinyl acetate).

| Abbreviations used: | | |
|---|---|---|
| AS | acrylic acid | Quantities are |
| MAS | methacrylic acid | always given in |
| EA | ethyl acrylate | percent by weight. |
| n-BA | n-butyl acrylate | |

-continued

Abbreviations used:

| | |
|---|---|
| t-BA | tert. butyl acrylate |
| OA | ethylhexyl acrylate |
| AA | acrylamide |
| MSA | maleic acid anhydride |

TABLE 1

| Graft Product | | I | II | III | IV | V | VI | VII a |
|---|---|---|---|---|---|---|---|---|
| Throughput [g/h] | | 950 | 950 | 1900 | 750 | 750 | 750 | 750 |
| Shaft Speed [revs. per min] | | 75 | 75 | 115 | 50 | 50 | 50 | 50 |
| Average dwell time [min.] | | 7 | 7 | 2.5 | 10 | 10 | 10 | 10 |
| Peroxide content after Oxidation [ppm] | | 1500 | 1400 | 700 | 1000 | 1000 | 1000 | 1000 |
| MFI Bed. E after Oxidation [g/10 min] | | 7.6 | 7.5 | 6.8 | 7.2 | 7.1 | 7.2 | 7.3 |
| Monomer feed [g/h] | | 70 | 130 | 300 | 130 | 120 | 130 | 150 |
| Monomer composition | | AS 15 parts 85 parts n-BA | MSA 20 parts 80 parts n-BA | AS | 10 parts AS 90 parts t-BA | n-BA | OA | 1 part AA 10 parts AS 89 parts n-BA |
| Conversion [%] | | 99 | 85 | 95 | 65 | 78 | 72 | 53 |
| Composition of product | | 7.3% AS 9.8% n-BA | 2.0% MSA | 3.1% AS 12% n-BA | 1.1% AS 10.6% t-BA | 12.5% n-BA | 12.3% OA | 0.2% AA 1.5% AS 9% n-BA |
| Residual peroxide content [ppm] | | 620 | 580 | 280 | 340 | 380 | 410 | 290 |
| MFI Bed. E of product [g/10 min] | | 1.8 | 0.5 | 3.7 | 5.2 | 4.8 | 5.0 | 2.3 |
| (conditions) | | | | | | | | |
| Intake zone | 2D | 110° | 110° | 110° | 110° | 110° | 110° | 110° |
| Melting zone | 5D | 180° | 180° | 180° | 180° | 180° | 180° | 180° |
| Compression zone | 2D | 180° | 180° | 180° | 180° | 180° | 180° | 180° |
| Induction zone | 3D | 225° | 225° | 230° | 215° | 215° | 215° | 215° |
| Oxidation zone | 6D | 190° | 190° | 210° | 170° | 170° | 170° | 170° |
| Compression zone | 2D | 190° | 190° | 200° | 170° | 170° | 170° | 170° |
| Degasification zone | 4D | 170° | 170° | 190° | 170° | 170° | 170° | 170° |
| Compression zone | 2D | 160° | 150° | 190° | 170° | 150° | 150° | 170° |
| Polymerisation zone | 8D | 140° | 150° | 195° | 170° | 150° | 150° | 190° |
| Compression zone | 2D | 140° | 150° | 195° | 170° | 150° | 150° | 190° |
| Evaporation zone | 7D | 140° | 150° | 195° | 170° | 150° | 150° | 190° |
| Extrusion zone | 5D | 140° | 150° | 195° | 170° | 150° | 150° | 190° |
| | 48D | | | | | | | |

Temperatures are measured in °C.

TABLE 2

| Graft Product | | VII b | VIII |
|---|---|---|---|
| Throughput g/h | | 3600 | 3800 |
| Shaft speed | | 30 | 40 |
| Average dwell time | | 7.5 | 7.0 |
| Peroxide content after Oxidation ppm | | 1200 | 1000 |
| MFI Bed. E after Oxidation [g/10 min] | | 4.3 | 5.4 |
| Monomer feed g/h | | 450 | 360 |
| Monomer composition | | 1 part AA 20 parts AS 79 parts n-BA | t-BA |
| Product composition | | 0.2% AA 2.2% AS 8.9% n-BA | 7.6% t-BA |
| Residual peroxide content ppm | | 540 | 460 |
| Conversion % | | 90 | 80 |
| MFI Bed. E of the product | | 0.4 | 1.2 |
| (Conditions) | | | |
| Intake zone | 2D | 100° | 100° |
| Melting zone | 4D | 140° | 140° |
| Compression zone | 1D | 180° | 180° |
| Induction zone | 2D | 230° | 235° |
| Oxidation zone | 5D | 190° | 210° |
| Compression zone | 1D | 180° | 200° |
| Degasification zone | 2D | 170° | 190° |
| Compression zone | 1D | 180° | 200° |
| Polymerisation zone | 10D | 180° | 205° |
| Compression zone | 1D | 180° | 205° |
| Evaporation zone | 6D | 190° | 200° |
| Extrusion zone | 3D | 210° | 200° |

TABLE 3

| Graft Product | | IX | X | XI |
|---|---|---|---|---|
| Throughput g/h | | 3600 | 3600 | 3600 |
| Shaft speed revs. per min | | 30 | 30 | 30 |
| Average dwell time (min) | | 7.5 | 7.5 | 7.5 |
| Peroxide content after Oxidation ppm | | 1300 | 1300 | 1300 |
| MFI Bed. E after Oxidation [g/10 min] | | 4.6 | 4.6 | 4.6 |
| Monomer feed g/h | | 180 | 450 | 400 |
| Monomer composition | | AS | 20 parts AS 80 parts n-BA | 1 part AA 20 parts AS 79 parts n-BA |
| Product composition | | 4.9% AS | 2.4% AS 9.4% n-BA | 0.2% AA 1.6% AS 8.5% n-BA |
| Residual peroxide content ppm | | 510 | 480 | 460 |
| Conversion % | | 99 | 95 | 96 |
| MFI Bed. E of product | | 1.5 | 2.1 | 1.8 |
| (Conditions) | | | | |
| Intake zone | 2D | 100° | 100° | 100° |
| Melting zone | 4D | 140° | 140° | 140° |
| Compression zone | 1D | 180° | 180° | 180° |
| Induction zone | 2D | 235° | 235° | 235° |
| Oxidation zone | 5D | 210° | 210° | 210° |
| Compression zone | 1D | 200° | 200° | 200° |
| Degasification zone | 2D | 190° | 190° | 190° |
| Compression zone | 1D | 170° | 180° | 180° |
| Polymerisation zone | 10D | 150° | 180° | 180° |
| Compression zone | 1D | 150° | 180° | 150° |
| Evaporation zone | 6D | 170° | 190° | 190° |
| Extrusion zone | 3D | 170° | 200° | 200° |

TABLE 4

| Graft Product | XII | XIII | XIV |
|---|---|---|---|
| Throughput g/h | 2500 | 2500 | 2500 |
| Shaft speed revs. per min | 25 | 25 | 25 |
| Average dwell time (min) | 10.8 | 10.8 | 10.8 |
| Peroxide content after Ox. ppm | 2500 | 2500 | 2500 |
| Mooney viscosity after Oxidation | 13 | 13 | 13 |
| Monomer feed g/h | 120 | 320 | 260 |
| Monomer composition | AS | 20 parts AS 80 parts n-BA | t-BA |
| Product composition | 4.6% AS | 2.3% AS 9.5% n-BA | 8.7% t-BA |
| Residual peroxide content ppm | 820 | 850 | 870 |
| Conversion % | 98 | 93 | 83 |
| Mooney viscosity of Product | 32 | 27 | 25 |
| (Conditions) | | | |
| Intake zone 2D | 60° | 60° | 60° |
| Melting zone 4D | 120° | 120° | 120° |
| Compression zone 1D | 120° | 120° | 120° |
| Induction zone 2D | 210° | 210° | 210° |
| Oxidation zone 5D | 180° | 180° | 180° |
| Compression zone 1D | 120° | 120° | 120° |
| Degasification zone 2D | 100° | 100° | 100° |
| Compression zone 1D | 120° | 160° | 170° |
| Polymerisation zone 10D | 150° | 180° | 190° |
| Compression zone 1D | 150° | 180° | 190° |
| Evaporation zone 6D | 170° | 180° | 190° |
| Extrusion zone 3D | 170° | 180° | 190° |

EXAMPLES 1–18

Incorporation of graft products I–XIV was carried out in a commercial double shaft extruder ZSK 53 of Werner and Pfleiderer at temperatures of from 265° to 290° C.

The preparation and composition of the alloys and their properties are summarized in Table 5.

The relative solution viscosities ($\eta$ rel) were determined on 1% solutions of the products in m-cresol at 20° C.

TABLE 5
Production and properties of the blends of polyamide and the graft product

| Example | Polyamide/$\eta$rel | graft polymer/% by weight | further additives | mixing Temperature °C. | $\eta$rel of the blend | impact strength kg/m² | flexural strength | homogeneity |
|---|---|---|---|---|---|---|---|---|
| 1 | PA-6/2,86 | I/10 | — | 265 | 3,37 | 22,3 | 95,3 | very good |
| 2 | " | II/10 | — | 265 | 3,28 | 21,6 | 96 | " |
| 3 | " | III/10 | — | 265 | 3,31 | 23,9 | 94,2 | " |
| 4 | " | IV/10 | — | 265 | 3,43 | 22,6 | 97,1 | " |
| 5 | " Comparison | 10% copolymeres of ethylene with 4% by weight AS and 7% b.w. t-BA MFI = 6,5 | — | 265 | 3,08 | 18,8 | 97 | " |
| 6 | PA-6,6/3,06 | V/10 | — | 285 | 3,58 | 25,2 | 95,3 | " |
| 8 | " | VIIa/10 | — | 285 | 3,62 | 27,8 | 93,8 | " |
| 9 | " | VIIb/20 | — | 285 | 3,85 | 43,9 | 86,6 | " |
| 7 | " | VI/10 | — | 285 | 3,47 | 22,8 | 94,5 | " |
| 10 | " | VIII/10 | — | 285 | 3,42 | 19,1 | 95 | " |
| 11 | " | IX/10 | 10% Polyethylene | 280 | 3,35 | 23,2 | 96,2 | good |
| 12 | " | X/10 | 10% Talkum | 290 | 3,57 | 15,7 | 93,4 | " |
| 13 | mixture of 50% by weight PA-6 + 50% b.w. PA-6,6 | XI/20 | — | 280 | 3,78 | 41,2 | 83 | very good |
| 14 | mixture of each 50% b.w. PA-6 u.-6,6 | XII/10 | — | 280 | 3,41 | 24,5 | 98,2 | very good |
| 15 | mixture of each 50% b.w. PA-6 u.-6,6 | XIII/10 | — | 280 | 3,45 | 21,4 | 95,1 | " |
| 16 | mixture of each 50% b.w. PA-6 u.-6,6 | XIV/10 | — | 280 | 3,52 | 23,6 | 96,9 | " |
| 17 | PA-6,6/3,98 | IV/10 | — | 285 | 4,39 | 32,8 | 94,6 | " |
| 18 | " | IV/10 | — | 285 | 4,73 | 68,3 | 84,7 | " |

We claim:
1. A polymer blend consisting of
I. from 60 to 99% by weight of a polyamide;
II. from 1 to 40% by weight of a graft product consisting of
   (a) from 70 to 99% by weight of a graft substrate of polyethylene and/or a copolymer of ethylene and a vinyl ester containing up to 50% by weight of the vinyl ester, and
   (b) from 1 to 30% by weight of grafted units of
      ($\alpha$) from 0 to 100% by weight, based on the total weight of grafted units, of (meth) acrylic acid,
      ($\beta$) from 0 to 100% by weight, based on the total weight of grafted units, of an ester of (meth) acrylic acid formed from an alcohol having from 1 to 8 carbon atoms,
      ($\gamma$) from 0 to 30% by weight, based on the total weight of grafted units, of acrylamide and
      ($\delta$) from 0 to 30% by weight, based on the total weight of grafted units, of maleic acid anhydride, the sum total of grafted units ($\alpha$) and ($\delta$) being 100% by weight of the total grafted units of said graft product and said products having been prepared by a process of graft polymerization which comprises bringing a solvent free melted polymer used as a graft substrate into contact with oxygen or an oxygen-containing gas at a pressure of from 1 to 150 bar and at a temperature of from 80° to 300° C. under conditions of vigorous mixing for a maximum of 10 minutes, adding immediately thereafter the monomers which are to be grafted under conditions of vigorous mixing in the absence of oxygen and oxygen-containing gas, and removing the residual monomers after polymerization; and III. from 0 to 20% by weight of polyethylene.

2. A blend as claimed in claim 1 which contains from 70 to 95% weight of polyamide.

3. A blend as claimed in claim 1 which contains from 5 to 30% by weight of graft product II.

4. A blend as claimed in claim 1 which contains from 0 to 10% by weight of polyethylene.

5. A blend as claimed in claim 1 wherein component II contains from 75 to 95% by weight of the graft substrate, and from 5 to 25% by weight of grafted units.

6. A blend as claimed in claim 1 wherein the ester of (meth) acrylic acid is formed from an alcohol having from 2 to 4 carbon atoms.

7. A blend as claimed in claim 1 wherein the grafted units are derived from acrylic acid, n-butyl acrylate and tert. butylacrylate.

8. A blend as claimed in claim 1 wherein the polyamide is polyamide-6, polyamide-6,6 or mixtures thereof.

9. A blend as claimed in claim 1 wherein the vinyl ester is vinyl acetate.

10. A moulded article when produced from a blend as claimed in claim 1.

* * * * *